United States Patent
Chandraker et al.

(10) Patent No.: US 9,070,202 B2
(45) Date of Patent: Jun. 30, 2015

(54) MOVING OBJECT LOCALIZATION IN 3D USING A SINGLE CAMERA

(71) Applicant: NEC Laboratories America, Inc., Princeton, NJ (US)

(72) Inventors: Manmohan Chandraker, Santa Clara, CA (US); Shiyu Song, Santa Clara, CA (US); Yuanqing Lin, Sunnyvale, CA (US); Xiaoyu Wang, Sunnyvale, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 1 day.

(21) Appl. No.: 14/184,766

(22) Filed: Feb. 20, 2014

(65) Prior Publication Data

US 2014/0270484 A1   Sep. 18, 2014

Related U.S. Application Data

(60) Provisional application No. 61/783,844, filed on Mar. 14, 2013.

(51) Int. Cl.
```
G06K 9/00      (2006.01)
G06T 7/20      (2006.01)
G06T 7/00      (2006.01)
```
(52) U.S. Cl.
CPC .......... *G06T 7/2033* (2013.01); *G06K 9/00805* (2013.01); *G06T 7/0042* (2013.01); *G06T 7/0071* (2013.01); *G06T 7/208* (2013.01); *G06T 2207/10016* (2013.01); *G06T 2207/20076* (2013.01); *G06T 2207/20081* (2013.01); *G06T 2207/30252* (2013.01)

(58) Field of Classification Search
CPC ... G06K 9/00201; G01S 17/93; G01S 17/936; G01S 7/4806; G01S 7/4808; G01S 17/06; G01S 17/58; B60W 30/095; G08G 1/167; G08G 1/168; G08G 1/166
See application file for complete search history.

(56) References Cited

U.S. PATENT DOCUMENTS

| | | | |
|---|---|---|---|
| 2004/0062419 A1* | 4/2004 | Roh et al. | 382/104 |
| 2004/0101161 A1* | 5/2004 | Roh et al. | 382/103 |
| 2011/0282581 A1* | 11/2011 | Zeng | 701/301 |
| 2014/0032093 A1* | 1/2014 | Mills | 701/301 |

OTHER PUBLICATIONS

Yuanqing Lin et al., 'Towards Visual 3D Scene Understanding for Autonomous driving', Media Analytics, NEC Labs America, Dec. 2, 2014 (http:/www.linyq.com/Penn_industry_day_v7.pdf) See pp. 9-17.

* cited by examiner

*Primary Examiner* — Brian Le
(74) *Attorney, Agent, or Firm* — Joseph Kolodka

(57) ABSTRACT

Systems and methods are disclosed for autonomous driving with only a single camera by moving object localization in 3D with a real-time framework that harnesses object detection and monocular structure from motion (SFM) through the ground plane estimation; tracking feature points on moving cars a real-time framework to and use the feature points for 3D orientation estimation; and correcting scale drift with ground plane estimation that combines cues from sparse features and dense stereo visual data.

16 Claims, 3 Drawing Sheets

---

Move object localization in 3D with a real-time framework that harnesses object detection and monocular structure from motion (SFM) through the ground plane estimation (20)

Track feature points on moving cars a real-time framework to and use the feature points for 3D orientation estimation (30)

Correct scale drift with ground plane estimation that combines cues from sparse features and dense stereo visual data (40)

Move object localization in 3D with a real-time framework that harnesses object detection and monocular structure from motion (SFM) through the ground plane estimation (20)

Track feature points on moving cars a real-time framework to and use the feature points for 3D orientation estimation (30)

Correct scale drift with ground plane estimation that combines cues from sparse features and dense stereo visual data (40)

FIG. 1A

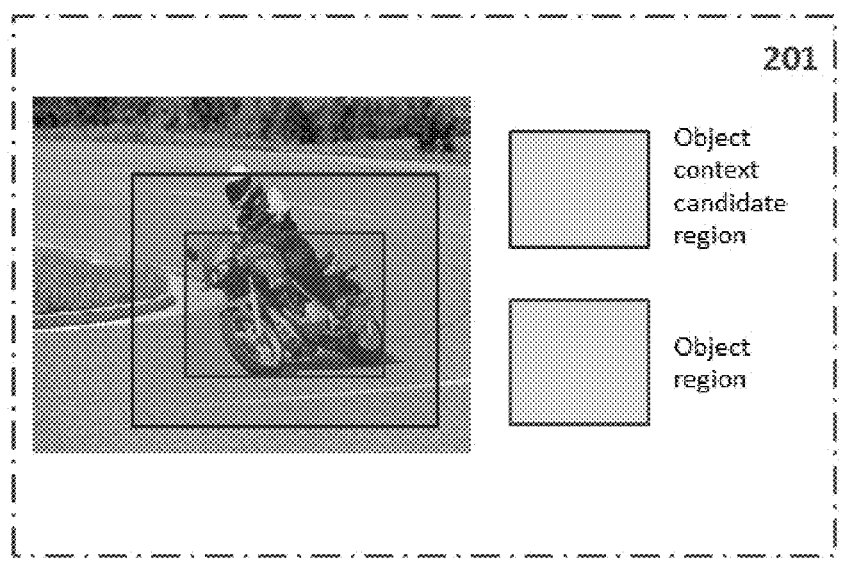

FIG. 1B

MOVING OBJECT LOCALIZATION IN 3D USING A SINGLE CAMERA

This application is a continuation of Provisional Application Ser. No. 61/783,844 filed Mar. 14, 2013, the content of which is incorporated by reference.

BACKGROUND

The present invention relates to Monocular SFM and Moving Object Localization.

Stereo-based SFM systems now routinely achieve real-time performance in both indoor and outdoor environments. Several monocular systems have also demonstrated good performance in smaller desktop or indoor environments. Successful large-scale monocular systems for autonomous navigation are less extant, primarily due to the challenge of scale drift. A large-scale monocular system handles scale drift with loop closure. While desirable for map building, delayed scale correction from loop closure is not an option for autonomous driving. Parallel monocular architectures like PTAM are elegant solutions for small workspaces. However, PTAM uses the existing distribution of points to restrict the epipolar search range, which is not desirable for fast-moving vehicles. It uses free time in the mapping thread when exploring known regions for data association refinement and bundle adjustment, however, scene revisits are not feasible in autonomous driving. Other system compute relative pose between consecutive frames. However, two-view estimation leads to high translational errors for narrow baseline forward motion.

Monocular SFM and scene understanding are attractive due to lower cost and calibration requirements. However, the lack of a fixed stereo baseline leads to scale drift, which is the primary bottleneck that prevents monocular SFM from attaining accuracy comparable to stereo. To counter scale drift, prior knowledge must be used, a popular avenue for which is the known height of the camera above the ground plane. Thus, a robust and accurate estimation of the ground plane is crucial to achieve good performance in monocular scene understanding. However, in real-world autonomous driving, the ground plane corresponds to a rapidly moving, low-textured road surface, which makes its estimation from image data challenging.

SUMMARY

In one aspect, a vision-based, real-time monocular structure from motion (SFM) and 3D moving object localization for real-world autonomous driving is disclosed.

In another aspect, a computer vision system for autonomous driving that uses only a single camera includes
 (i) a real-time framework for moving object localization in 3D that harnesses object detection and monocular structure from motion (SFM) through the ground plane estimation
 (ii) a real-time framework to track feature points on moving cars and use them for 3D orientation estimation
 (iii) a mechanism to correct scale drift using ground plane estimation that combines cues from sparse features and dense stereo visual data.

In yet another aspect, a method for autonomous driving with only a single camera includes moving object localization in 3D with a real-time framework that harnesses object detection and monocular structure from motion (SFM) through the ground plane estimation; tracking feature points on moving cars a real-time framework to and use the feature points for 3D orientation estimation; and correcting scale drift with ground plane estimation that combines cues from sparse features and dense stereo visual data.

Advantages of the system may include one or more of the following. The system provides a robust monocular SFM with high accuracy and achieves rotation accuracy close to current best stereo systems and translation accuracy far exceeding other monocular architectures. High performance is achieved by scale drift correction using ground plane estimation that combines cues from sparse features and dense stereo. A data-driven mechanism for cue combination learns models from training data to relate observation covariances for each cue to error variances of underlying variables. This allows per-frame adaptation of observation covariances based on relative confidences inferred from visual data. The framework for moving object localization in 3D achieves high accuracy by harnessing mutual benefits of object detection and SFM, through an accurate ground plane. The incorporation of the SFM cues and ground plane estimation can drastically improve the performance of 3D localization frameworks.

BRIEF DESCRIPTION OF THE DRAWINGS

FIG. 1A shows an exemplary computer vision method for autonomous driving that uses only a single camera.

FIG. 1B shows an exemplary Selective Context Modeling for Object Detection process.

DESCRIPTION

Figure 2:
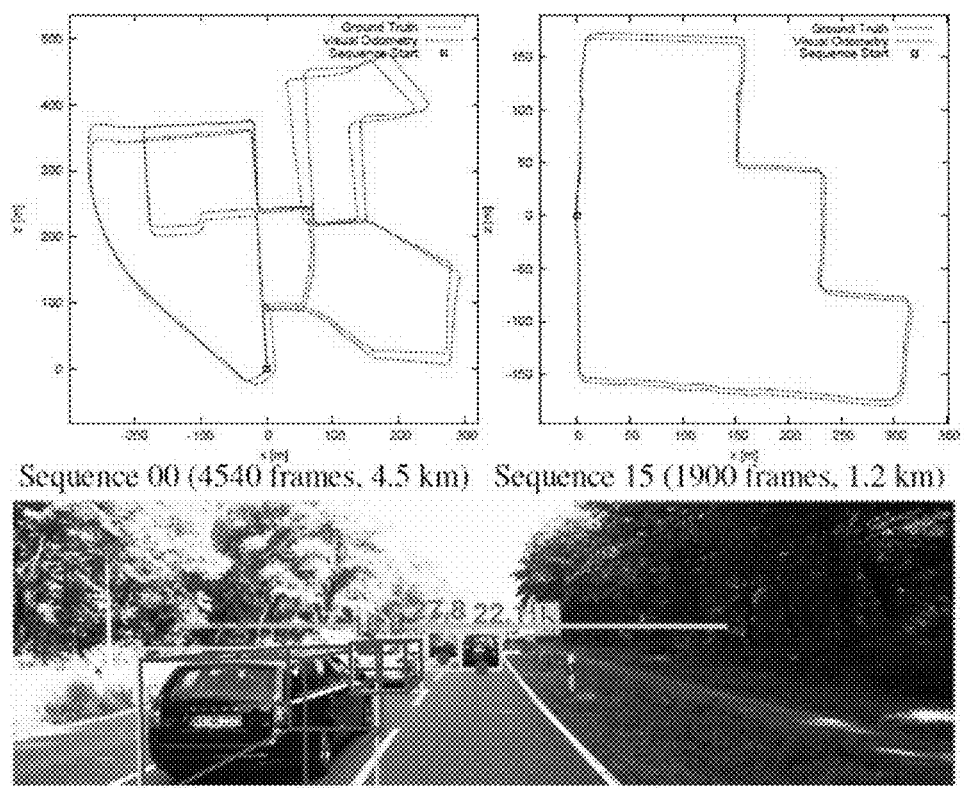
FIG. 2 shows the operation of one embodiment of FIG. 1A.

FIG. 1A shows an exemplary computer vision system for autonomous driving that uses only a single camera. The method for autonomous driving with only a single camera includes moving object localization in 3D with a real-time framework that harnesses object detection and monocular structure from motion (SFM) through the ground plane estimation (20); tracking feature points on moving cars a real-time framework to and use the feature points for 3D orientation estimation (30); and correcting scale drift with ground plane estimation that combines cues from sparse features and dense stereo visual data (40).

The system's high performance is due to the scale drift correction using ground plane estimation that combines cues from sparse features and dense stereo. The data-driven mechanism for cue combination learns models from training data to relate observation covariances for each cue to error behavior of underlying variables. During testing, this allows per-frame adaptation of observation covariances based on relative confidences inferred from visual data. The framework for localization of moving objects in 3D achieves high accuracy by harnessing the mutual benefits of 2D object bounding boxes and SFM, through an accurate ground plane.

FIG. 1B shows an exemplary Selective Context Modeling for Object Detection process. Context information has been largely used in object detection algorithms, including but not limited to responses from other detectors, responses from image classification models or visual appearance from the background. Our proposal deals with the problem of efficient background context learning. Not all the object background helps with object detection. To determine the effective background context, we propose a set of background regions. A boosting learning process is employed to explore these regions and select most discriminative ones.

As shown in FIG. 1B, our goal is to detect the motorbike. To incorporate background context, we explore an extended region beyond the object bounding box, i.e. the pink region. We randomly select 3000 sub-regions from the object background in pink. Features extracted from these sub-regions are fed to the boosting process as input of weak learners. The most discriminative ones, i.e., sub-regions which most benefit object detection accuracy are selected and augmented to the final boosting classifier. Our approach improves the object detection mean average precision by 2% in the PASCAL VOC 2007 dataset.

Our system provides a comprehensive, accurate, robust and real-time large-scale monocular structure from motion (SFM) system that enables real-world autonomous outdoor driving applications. Our system relies on novel multi-threaded architectures for structure from motion that allow handling large motions and rapidly changing imagery for fast-moving vehicles. Design highlights of the system include parallel epipolar search for extensive validation of feature matches over long tracks and a novel keyframe architecture that allows insertion at low cost. This allows us to meet a key requirement for autonomous driving: robust operation of our system at 30 fps on the average, with output guaranteed at every frame within 50 ms. To resolve the scale ambiguity of monocular SFM, we estimate the height of the ground plane at every frame. Cues for ground plane estimation include triangulated 3D points and plane-guided dense stereo matching. These cues are combined in a flexible Kalman filtering framework, which we train rigorously to operate with the correct empirical covariances. We perform extensive validation on nearly 50 km of real-world driving sequences from the challenging KITTI dataset to achieve the best-to-date accuracy for large scale real-time monocular systems: 0.01° per frame rotation and 4% translation error.

The benefits of the system include:
Highly accurate real-time monocular SFM that achieves performance comparable to stereo.
Scale drift correction by adaptively combining multiple cues for ground plane estimation using learned models to correctly weight per-frame observation covariances.
A 3D object localization framework that combines detection and monocular SFM through the ground plane, to achieve accurate localization in both near and far fields.

FIG. 2 shows the operation of one embodiment of FIG. 1A. In the top row, our monocular SFM yields camera trajectories close to the ground truth over several kilometers of real-world driving. On KITTI dataset, we outperform most stereo systems in rotation, with translation errors also comparable to stereo and far lower than other monocular SFM systems. Scale drift correction using a novel, adaptive ground plane estimation allows such accuracy and robustness. On the bottom row, we demonstrate a 3D moving object localization framework that combines SFM with 2D object bounding boxes to derive advantages from our adaptive ground estimation. Cyan denotes 2D bounding boxes, green is the horizon from estimated ground plane, red denotes estimated 3D localization for far and near objects, with distance in magenta.

The system incorporates cues from multiple methods of ground plane estimation and second, we combine them in a principled framework that accounts for their per-frame relative confidences, using models learned from extensive training data.

To combine cues, the system uses a Kalman filter that adapts the fusion observation covariances at every frame to reflect the relative uncertainties. This is achieved in one embodiment by a training procedure on over 20000 frames from the KITTI dataset, whereby models are learned that relate the observation covariance for each cue to variances corresponding to error distributions for each underlying variable. A highly accurate ground plane has immediate benefits for scene understanding applications like single-camera localization of moving rigid objects (cars) in 3D. A new localization framework combines information from object bounding boxes and SFM feature tracks, through the ground plane. Intuitively, SFM can allow accurate feature matches on nearby objects, but suffers due to the low resolution of those far away. On the other hand, bounding boxes from object detection or appearance-based tracking are obtainable for distant objects, but are often inconsistent with the 3D scene in the near field. Thus, SFM and detection can mutually counter each other's drawbacks. By combining SFM and detection through the adaptive ground plane, the system significantly improves 3D localization for both nearby and distant objects. The benefit of our cue combination is available even for more comprehensive monocular scene understanding frameworks.

The system incorporates cues from multiple methods of ground plane estimation and second, combines them in a principled framework that accounts for their per-frame relative confidences, using models learned from extensive training data. To combine cues, a Kalman filter framework adapts the fusion observation covariances at every frame to reflect the relative uncertainty of each cue. This is achieved by a training procedure on over 20000 frames from the KITTI dataset, whereby models are learned that relate the observation covariance for each cue to the error behaviors of its underlying variables. To the best of our knowledge, such adaptive estimation of observation covariances for cue combination is novel.

A highly accurate ground plane has immediate benefits for scene understanding applications like single-camera localization of moving rigid objects (cars) in 3D. To demonstrate that, a localization framework combines information from object bounding boxes and SFM feature tracks, through the ground plane. Intuitively, SFM can allow accurate feature matches on nearby objects, but suffers due to the low resolution of those far away. On the other hand, bounding boxes from object detection or appearance-based tracking are obtainable for distant objects, but are often inconsistent with the 3D scene in the near field. Moreover, each independently moving object in monocular SFM may at best be estimated up to an unknown scale factor. The contact of a 2D bounding box with an accurate ground plane provides a cue to resolve this scale.

Combining SFM and object bounding boxes through the adaptive ground plane significantly improves 3D localization for both near and distant objects. The benefit of our cue combination is available even for more comprehensive monocular scene understanding frameworks.

Visual odometry is an inherently sequential operation. This is especially true for autonomous navigation as opposed to indoor or desktop applications, where the possibility of repeatedly viewing the same scene structures is high. For rapidly changing points in the visible field of view, bundle adjustment must be per-frame rather than with the interrupt mechanism of PTAM, else by the time the refined points become available, they are not useful any more. Thus, designing a multithreaded system requires achieving a delicate balance between accuracy and latency.

Our multithread architecture allows elegant extension to as many threads as desired. Besides the obvious speed advantages, multithreading also greatly contributes to the accuracy and robustness of the system. As an example, consider our epipolar contrained search. A single-thread version of a system that relies on 2D-3D correspondences might update its stable point set by performing an epipolar search in the frame preceding a keyframe. However, the support for the 3D points introduced by this mechanism is limited to just the triplet used for the circular matching and triangulation. By moving the epipolar search to a separate thread and performing the circular matching at every frame, we may supply 3D points with tracks of length up to the distance from the preceding keyframe. Clearly, the set of long tracks provided by the epipolar thread in our multithread system is far more likely to be free of outliers.

To handle scene points rapidly moving out of view in autonomous driving applications, candidate point sets usable for pose estimation are continually updated in a dedicated thread. The epipolar update is extended to handle high speeds using a rough vanishing point estimation. For every feature $f_0$ in the most recent keyframe at location $(x_0, y_0)$, a square of side length proportional to camera velocity, centered at $(x_0 + \Delta x, y_0 + \Delta y)$ in frame n is considered. The displacement $(\Delta x, \Delta y)$ is computed based on the distance of $(x_0, y_0)$ from the vanishing point. Estimation of $(\Delta x, \Delta y)$ helps in fast highway sequences, where disparity ranges can vary significantly between the far and near fields.

A sliding window bundle adjustment operates in a parallel thread with the epipolar search. Keyframes are added to trigger larger refinements. During small motions, the result is enhanced by preventing keyframe addition and ensuring the previous keyframe is included in the bundle cache. This yields improved pose estimates for near-stationary situations. After refinement, the system is also given a chance to re-find 3D points temporarily lost due to artifacts like blur or specularities. The publicly available SBA package [?] is used for bundle adjustment.

Scale drift is corrected using calibrated height of camera from ground, $h^*$. Let h be an estimated height of ground plane, then camera poses are adjusted by a scale factor $f=h^*/h$, followed by bundle adjustment. In Sec. 5, we describe a novel approach to cue combination that yields highly accurate h.

To combine estimates from various methods, th system uses a Kalman filter. Its model of state evolution is $$x^k = Ax^{k-1} + w^{k-1}, p(w):N(0,Q),$$

$$z^k = Hx^k + v^{k-1}, p(v):N(0,U), \quad (1)$$

where x is the state variable, z the observation, while Q and U are the covariances of the process and observation noise, respectively, that are assumed to be zero mean multivariate normal distributions. Suppose methods $j=1, \ldots, m$ are used for estimating the ground plane, each with its observation covariance $U_j$. Then, with $(U^k)^{-1} = \sum_{j=1}^{m}(U_j^k)^{-1}$, the fusion equations at time instant k are $$z^k = U^k \sum_{j=1}^{m}(U_j^k)^{-1} z_j^k, \quad H^k = U^k \sum_{j=1}^{m}(U_j^k)^{-1} H^k. \quad (2)$$

Meaningful estimation of $U^k$ at every frame, with the correctly proportional $U_j^k$ for each cue, is essential for principled cue combination. Traditionally, fixed covariances are used to combine cues, which does not account for the per-frame variation in the effectiveness of each cue across a video sequence. A rigorous data-driven module learns models to adapt per-frame covariances for each cue, based on error distributions of the underlying variables.

Scale drift correction is an integral component of monocular SFM. In practice, it is the single most important aspect that ensures accuracy. We estimate the depth and orientation of the ground plane relative to the camera for scale correction.

We use multiple methods like triangulation of feature matches and dense stereo to estimate the ground plane. The system combines these cues to reflect our belief in the relative accuracy of each cue. Naturally, this belief should be influenced by both the input at a particular frame and observations from training data. We achieve this by learning models from extensive training data to relate the observation covariance for each cue to error behavior of its underlying variables. During testing, the error distributions at every frame adapt the data fusion observation covariances using those learned models.

Plane-guided Dense Stereo is detailed next. We assume a region in the foreground (middle fifth of the lower third of the image) to be the road plane. For a hypothesized value of (h,n), the stereo cost function computation determines the homography mapping between frames k and k+1 as $G=R+h^{-1}tn^T$, where (R,t) is the relative pose from monocular SFM. Note that t differs from the true translation by a scale drift factor, encoded in the h we wish to estimate. Pixels in frame k+1 are mapped to frame k (subpixel accuracy is important for good performance) and the sum of absolute differences (SAD) is computed over bilinearly interpolated image intensities. A Nelder-Mead simplex routine is used to estimate the (h,n) that minimize this cost function. Note that the optimization only involves the three variables h, $n_1$ and $n_3$, since PnP=1. In practice, the optimization cost function usually has a clear local minimum, as shown in FIG. 1. The optimization requires 10 ms per frame on average.

Turning now to triangulated 3D Points, we consider matched SIFT descriptors between frames k and k+1, computed within the above region of interest (we find ORB descriptors to be not powerful enough for the low texture of the road and real-time performance is attainable for SIFT in this small region). To fit a plane through the triangulated 3D points, one option is to estimate (h,n) using a 3-point RANSAC for plane-fitting, however, in our experiments, better results are obtained using the method of [?], by assuming the camera pitch to be fixed from calibration. For every triangulated 3D point i, the height difference $\Delta h_{ij}$ is computed with respect to every other point j. The estimated ground plane height is the height of the point i corresponding to the maximal score q, where $$q = \max_i \left\{ \sum_{j \neq i} \exp(-\mu \Delta h_{ij}^2) \right\}, \text{ where } \mu = 50. \quad (3)$$

Other systems may decompose the homography mapping G between frames to yield the camera height. However, in practice, the decomposition is very sensitive to noise, which is a severe problem since the homography is computed using feature maches from the low-textured road surface. We also note that the homography-decomposition cannot be expected to perform better than the 3D points cue, since they both rely on the same set of feature matches. Further, the fact that road regions may be mapped by a homography is already exploited by our plane-guided dense stereo.

Data-Driven Learning for Cue Combination is detailed next. The ground plane cues provided by the two methods above are combined in a Kalman filter framework significantly different from prior works. To account for instantaneous variations in relative strengths of each cue, we use a training mechanism that learns models to adapt observation covariances in proportion to belief in the relative effectiveness of each cue.

The training data for our experiments consists of F=23201 frames from sequences 0 to 10 of the KITTI dataset, which come with Velodyne depth sensor information. To determine the ground truth h and n, we label regions of the image close to the camera that are road and fit a plane to the associated 3D points (no label information is available or used during testing).

Our state variable in (1) is simply the equation of the ground plane, thus, $x=(n,h)^T$. Since $\|n\|=1$, $n_2$ is determined by $n_1$ and $n_3$ and our observation is $z=(n_1,n_3,h)^T$. Thus, our state transition matrix and the observation model are given by $$A = \begin{bmatrix} R & t \\ 0^T & 1 \end{bmatrix}^T, \quad H = \begin{bmatrix} 1 & 0 & 0 & 0 \\ 0 & 0 & 1 & 0 \\ 0 & 0 & 0 & 1 \end{bmatrix}. \quad (4)$$

Dense Stereo

We make the approximation that state variables are uncorrelated. For a training image, let $(\hat{n},\hat{h})$ be the ground plane estimated by the dense stereo method. We first fix $n_1=\hat{n}_1$ and $n_3=\hat{n}_3$ and for 50 uniform samples of h in the range $[0.5\,\hat{h},1.5\,\hat{h}]$, construct homography mappings from frame k to k+1, given by $$G = R + h^{-1}\hat{m}^T.$$

For each homography mapping, we compute the SAD score corresponding to the road region using bilinearly interpolated image intensities and consider the value $s=1-\rho^{-SAD}$, where $\rho=1.5$. A univariate Gaussian is now fit to the distribution of s, whose variance $\sigma_{s,h}^k$ captures the sharpness of the SAD distribution, which reflects belief in accuracy of height h estimated from the dense stereo method at frame k. A similar procedure yields variances $\sigma_{s,n_1}^k$ and $\sigma_{s,n_3}^k$ corresponding to orientation variables.

For each frame k, let $e_{s,h}^k$ be the error in ground plane height, relative to ground truth, estimated from dense stereo alone. Then, we consider the histogram of $e_{s,h}^k$ with B=1000 bins over variances $\sigma_{s,h}^k$, with bin centers positioned to match the density of $\sigma_{s,h}^k$ (that is, we distribute roughly F/B error observations within each bin). We compute variances $\sigma_{s,h}'$ corresponding to the errors $e_{s,h}$ within each bin b=1, ..., B, which is the observation variance. Next, we fit a curve to the distribution of $\sigma_{s,h}'$ versus $\sigma_{s,h}$, which provides a learned model to relate observation variance in h to the effectiveness of dense stereo. Empirically, we observe that a straight line suffices to produce a good fit. A similar process is repeated for $n_1$ and $n_3$.

The covariance estimation for the method that uses triangulated 3D points differs from the stereo method, since the normal n is assumed known from the camera pitch and only the height h is an estimated entity. During training, let $$\hat{h}_p^k$$

be ground height estimated at frame k using 3D points alone. For $$h \in \left[0.5\,\hat{h}_p^k, 1.5\,\hat{h}_p^k\right],$$

we compute the height error $e_p^k$ with respect to ground truth and the sum q defined in (3). Note that q reflects belief in accuracy of height estimated from 3D points. As in the case of dense stereo, a histogram is computed with B=1000 bins and approximately F/B observations of $e_p^k$ are recorded at each bin, centered at $q^b$, for b=1, ..., B. The histogram for the KITTI dataset is shown in FIG. 4. Let $\sigma_{p,h}^b$ be the variance of bin b. Then, we compute the straight line fit through the data points $(\sigma_{p,h}^b, q^b)$, which is a learned model that relates observation covariance in h to expected effectiveness of the 3D points cue.

Since $n_1$ and $n_3$ are assumed fixed for this cue, fixed variance estimates $\sigma_{p,n_1}$ and $\sigma_{p,n_3}$ are computed, as the variances of errors in $n_1$ and $n_3$ with respect to ground truth.

For the dense stereo cue during test time, at frame j, we again fit 1D Gaussians to the homography-mapped SAD scores to get the values of $\sigma_s^j(h)$, $\sigma_s^j(n_1)$ and $\sigma_s^j(n_1)$. Using the line-fit parameters, we predict the corresponding values of $\sigma_s^j$. The observation covariance for the dense stereo method is now available as $U_1^j=\text{diag}(\sigma'^j_{s,n_1},\sigma'^j_{s,n_3},\sigma'^j_{s,h})$.

For the 3D points cue, at frame j, the value of q is computed and the corresponding $\sigma_p^j(h)$ is estimated from the line-fit in FIG. 4. The observation covariance for this method is now available as $U_2^j=\text{diag}(\sigma_{p,n_1}^j,\sigma_{p,n_3}^j,\sigma_{p,h}^j)$.

Finally, the adaptive covariance for frame j, $U^j$, is computed by combining $U_1^j$ and $U_2^j$ according to (2).

For moving object localization in 3D, SFM and 2D object bounding boxes offer inherently complementary cues for scene understanding. SFM produces reliable tracks for nearby objects, but suffers from low resolution in far field. On the other hand, detection or tracking bounding boxes tend to be consistent with the 3D scene for far objects, but may be inaccurately aligned with the near scene due to perspective challenges. In this section, we use a framework that combines SFM and 2D object bounding boxes, through an accurate ground plane, to localize both near and far objects in 3D.

Consider camera coordinate system C with orthonormal axes $(\alpha_c,\beta_c,\gamma_c)$ and an object coordinate O with axes $(\alpha_o,\beta_o,\gamma_o)$. Let the origin of object coordinates be $c_o=(x_o,y_o,z_o)^T$ in camera coordinates, corresponding to center of the line segment where the back plane of the object intersects the ground. We assume that the object lies on the ground plane and is free to rotate in-plane with yaw angle $\psi$. Then, the object pose is defined as $\Omega=(x_o,z_o,\psi,\theta,\phi,h)^T$, where the ground plane is parameterized as $(n,h)^T=(\cos\theta\cos\phi, \cos\theta\sin\phi, \sin\theta,h)^T$. The coordinate systems are visualized in FIG. 1.

Define $N=[n_\alpha,n_\beta,n_\gamma]$, where $n_\gamma=(-n_1,n_3,-n_2)^T$, $n_\beta=-n$ and $n_\alpha=n_\beta \times n_\gamma$. Then, the transformation from object to camera coordinates is given by $$\overset{\Box}{x}_c = P_\pi P_\psi \overset{\Box}{x}_o,$$

with $$P_\pi = \begin{bmatrix} N & c_o \\ 0 & 1 \end{bmatrix}, \quad P_\psi = \begin{bmatrix} \exp([\omega_\psi]_\times) & 0 \\ 0^T & 1 \end{bmatrix}, \quad (5)$$

where $\omega_\psi=(0,\psi,0)^T$ and $[\bullet]_\times$ is the cross product matrix.

Next, Joint Optimization for Localization is detailed. To localize the object in 3D, we minimize a weighted sum of an SFM cost and an object cost, over a window of M frames.

To determine SFM Cost, let N features on the object be tracked in frames k=1, ..., M, with 3D positions in object coordinates given by $X_o = [x_1, \ldots, x_N]$. The projection $u_j^k = (u_j^k, v_j^k)^T$ of point $x_j$ in frame k is given by the homogeneous relation $$\lambda_j^k \hat{u}_j^k = K[I \mid 0] P_\pi^k P_\psi^k \hat{x}_j. \quad (6)$$

Then, if $\bar{u}_j^k = (\bar{u}_j^k, \bar{v}_j^k)^T$ is the observed projection, an SFM reprojection error for the feature tracks may be defined as $$E_s^k = \sum_{j=1}^{N} \left( u_j^k - \bar{u}_j^k \right)^2 + \left( v_j^k - \bar{v}_j^k \right)^2. \quad (7)$$

Note that there is an overall ambiguity in the origin of O with respect to C that cannot be resolved by SFM alone. To do so, we require input from object bounding boxes.

Object Cost: Let the dimensions of the object 3D bounding box (to be estimated) be $l_\alpha, l_\beta, l_\gamma$ along the $\alpha_o, \beta_o, \gamma_o$ axes. Then, locations of the 3D bounding box vertices, in object coordinates, are $v_1 = (-l_\alpha/2, 0, 0)^T, \ldots, v_8 = (l_\alpha/2, -l_\beta, l_\gamma)^T$. The image projections $q_i^k = (p_i^k, q_i^k)^T$ of the 3D vertices $v_i$ in frame k are $$\lambda_i^k \hat{q}_i^k = K[I \mid 0] P_\pi^k P_\psi^k \hat{v}_i, i = 1, \ldots, 8, \quad (8)$$

where $\lambda_i^k$ are the homogeneous scale factors. Define $$b_1^k = \min_i p_i^k, \ b_2^k = \max_i p_i^k, \ b_3^k = \min_i q_i^k, \ b_4^k = \max_i q_i^k$$

as the projected edges of the bounding box in frame k. Then, if $\bar{b}_j^k$, for $j = 1, \ldots, 4$, are the observed edges of the bounding box, one may compute an "object" reprojection error:

$$E_o^k = \sum_{i=1}^{4} \left( b_i^k - \bar{b}_i^k \right)^2. \quad (9)$$

Joint Optimization. The object pose is computed as:

$$\min_{\Omega^k, X_o, l_\alpha, l_\beta, l_\gamma} \sum_{k=1}^{M} E_o^k + v \sum_{k=1}^{M} E_s^k + \delta(l_\gamma - \eta l_\alpha)^2, \quad (10)$$

with a prior that encourages the ratio of bounding box sizes along $\gamma_o$ and $\alpha_o$ to be $\eta$. The practical reason for this regularization is that the camera motion is largely forward and most other vehicles in the scene are similarly oriented, thus, the localization uncertainty along $\gamma_o$ is expected to be higher. By training on ground truth 3D bounding boxes in the KITTI dataset, we set $\eta = 2.5$. The values of v and $\delta$ are empirically set to 100 and 1, respectively, across all our experiments.

We note the complementary nature of $E_o$ and $E_s$. While the SFM term guides object orientation, the bounding box resolves size and fixes the object origin. The optimization in (10) may be solved using a sparse Levenberg-Marquardt algorithm, thus, is fast enough to match the real-time monocular SFM.

The success of a local minimization framework as defined above is contingent on a good initialization. We again rely on an accurate ground plane estimation along with cues from both 2D bounding boxes and SFM to initialize the variables.

Object bounding boxes circumvent the problem of motion segmentation in driving scenes, where object motions are often correlated. They also allow independent feature tracking for each object. For object points, 3D tracks are estimated using a similar framework as discussed above. Rigid-body motion allows a PnP verification to discard non-object points within the bounding box as outliers. The window sizes for feature tracking are set to be inversely proportional to the rough depth estimate since far objects usually have smaller disparity signatures. Thus, the accurate ground plane estimation also proves useful for stabilizing the feature tracking.

To solve the object scale ambiguity (different from scale ambiguity of monocular SFM), we compute $\bar{h}$ the average h estimated in $\Omega^1, \ldots, \Omega^M$. Then the scale factor is $f = h^*/\bar{h}$, where $h^*$ is the known height of ground plane. The length variables in object pose are updated to $fx_o, fz_o$ and fh, followed by another nonlinear refinement similar to (10).

We have presented a real-time monocular SFM and 3D object localization system that achieves outstanding accuracy in real-world autonomous driving. The fact that our monocular SFM performs nearly as well as stereo is attributable to robust correction of scale drift. We have demonstrated that it is beneficial to include cues such as dense stereo, besides the traditional spare features used in prior works. This cue combination must be informed by prior knowledge of training data, as well as reflect the per-frame relative confidences, the advantages of which are established in our extensive experiments. Besides SFM, an accurately estimated ground plane also enables applications such as moving object localization in 3D. Our simple localization system combines object bounding boxes and SFM feature tracks, through an accurate ground plane, to yield highly accurate 3D positions of moving cars in real driving sequences.

In future work, deeper integration of object detection or tracking may extend the training procedure of Sec. 5 to map bounding box scores to height error, thus, object terms in (10) may also be weighted by relative confidences. While localization is currently used as post-processing to aid detection or appearance-based tracking (such as removing false positives), incorporating 3D cues at earlier stages can have larger benefits.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

Figure 3:
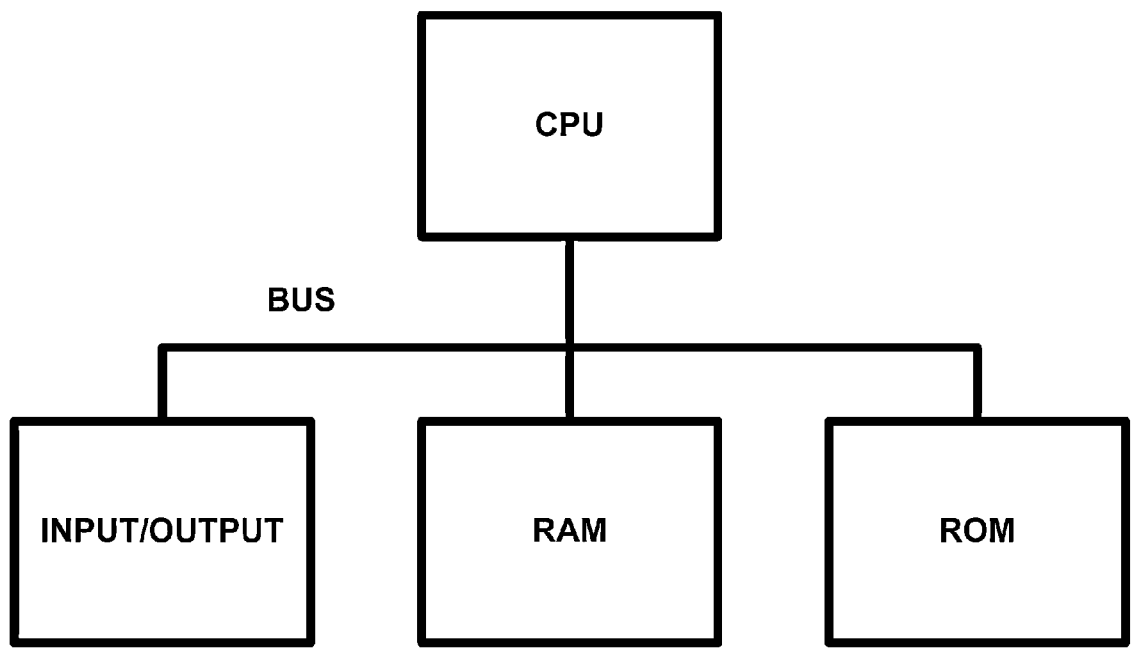
FIG. 3 shows an exemplary computer working with the system of FIG. 1A.

By way of example, a block diagram of a computer to support the system is discussed in FIG. 3. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A computer vision method for autonomous driving that uses only a single camera, comprising:
   moving object localization in 3D with a real-time framework that harnesses object detection and monocular structure from motion (SFM) through a ground plane estimation;
   tracking feature points on moving cars a real-time framework to and use the feature points for 3D orientation estimation;
   correcting scale drift with ground plane estimation that combines cues from sparse features and dense stereo visual data; and
   applying a Kalman filter framework that adapts the fusion observation covariances at every frame to reflect the relative uncertainty of each cue, the Kalman filter comprising a model of state of evolution as $$x^k = Ax^{k-1} + w^{k-1}, p(w):N(0,Q),$$

$$z^k = Hx^{k-1} + v^{k-1}, p(v):N(0,U),$$

where x represents a state variable, z an observation, Q and U represent covariances of process and observation noise and are assumed to be zero mean multivariate normal distributions as indicated by $p(w):N(0,Q)$ and $p(v):N(0,U)$, A represents state transition, w a process noise, H an observation that maps true state space into observed state space, and v an observation noise.

2. The method of claim 1, comprising incorporate cues from multiple methods of ground plane estimation.

3. The method of claim 1, comprising applying a framework that accounts for per-frame relative confidences using models learned from extensive training data.

4. The method of claim 1, comprising training with frames from a dataset, wherein models are learned that relate an observation covariance for each cue to error behaviors of underlying variables.

5. The method of claim 1, comprising performing adaptive estimation of observation covariances for cue combination.

6. The method of claim 1, comprising localization framework that combines information from object bounding boxes and SFM feature tracks, through the ground plane.

7. The method of claim 1, comprising combining SFM and object bounding boxes through the adaptive ground plane for 3D localization of near and distant objects.

8. The method of claim 1, comprising performing epipolar update with a rough vanishing point estimation.

9. A computer vision system for autonomous driving that uses only a single camera, comprising:
   a real-time framework for moving object localization in 3D that harnesses object detection and monocular structure from motion (SFM) through the ground plane estimation,
   a real-time framework to track feature points on moving cars and use them for 3D orientation estimation,
   computer code to correct scale drift using ground plane estimation that combines cues from sparse features and dense stereo visual data, and
   a Kalman filter framework that adapts the fusion observation covariances at every frame to reflect the relative uncertainty of each cue, the Kalman filter comprising a model of state of evolution as $$x^k = Ax^{k-1} + w^{k-1}, p(w):N(0,Q),$$

$$z^k = Hx^{k-1} + v^{k-1}, p(v):N(0,U),$$

where x represents a state variable, z an observation, Q and U represent covariances of process and observation noise and are assumed to be zero mean multivariate normal distributions as indicated by $p(w):N(0,Q)$ and $p(v):N(0,U)$, A represents state transition, w a process noise, H an observation that maps true state space into observed state space, and v an observation noise;
   wherein the system includes a processor for processing the real time framework and the computer code.

10. The system of claim 9, wherein the framework incorporates cues from multiple methods of ground plane estimation.

11. The system of claim 9, wherein the framework that accounts for per-frame relative confidences, using models learned from extensive training data.

12. The system of claim 9, wherein models are learned that relate an observation covariance for each cue to error behaviors of underlying variables.

13. The system of claim 9, comprising an adaptive estimator of observation covariances for cue combination.

14. The system of claim 9, comprising localization framework that combines information from object bounding boxes and SFM feature tracks, through the ground plane.

15. The system of claim 9, wherein SFM and object bounding boxes through the adaptive ground plane for 3D localization of near and distant objects.

16. The system of claim 9, comprising an epipolar update with a rough vanishing point estimation.

* * * * *